July 26, 1966 L. KRAMER 3,262,526
DUODIRECTIONAL OVERRUNNING CLUTCH
Filed March 19, 1964 5 Sheets-Sheet 1

INVENTOR.
LEO KRAMER
BY
ATTORNEY

July 26, 1966  L. KRAMER  3,262,526
DUODIRECTIONAL OVERRUNNING CLUTCH
Filed March 19, 1964  5 Sheets-Sheet 2

INVENTOR.
LEO KRAMER
BY
ATTORNEY

July 26, 1966 L. KRAMER 3,262,526
DUODIRECTIONAL OVERRUNNING CLUTCH
Filed March 19, 1964 5 Sheets-Sheet 3
FIG. 9
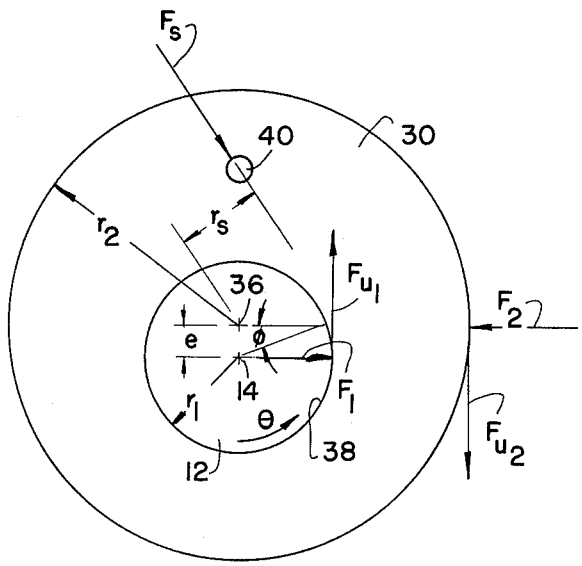
$F_{u_1} = u_1 \cdot F_1$
$F_{u_2} = u_2 \cdot F_2$
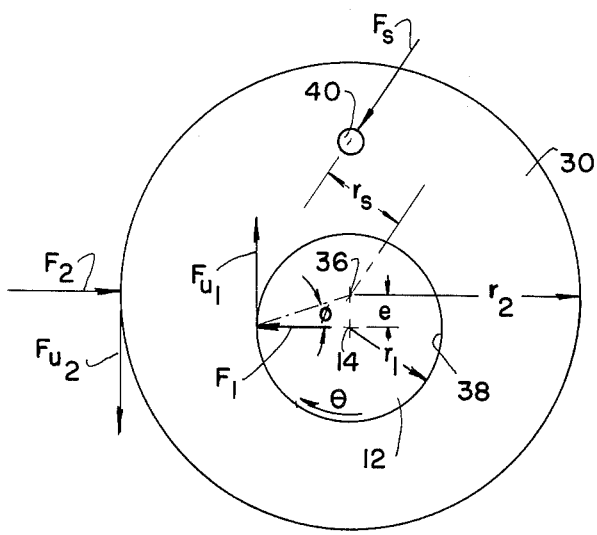
FIG. 10
$F_{u_1} = u_1 \cdot F_1$
$F_{u_2} = u_2 \cdot F_2$
INVENTOR.
LEO KRAMER
BY
ATTORNEY July 26, 1966  L. KRAMER  3,262,526
DUODIRECTIONAL OVERRUNNING CLUTCH
Filed March 19, 1964  5 Sheets-Sheet 4

INVENTOR.
LEO KRAMER
BY
ATTORNEY

July 26, 1966

L. KRAMER 3,262,526

DUODIRECTIONAL OVERRUNNING CLUTCH

Filed March 19, 1964

United States Patent Office 3,262,526
Patented July 26, 1966

3,262,526
DUODIRECTIONAL OVERRUNNING CLUTCH
Leo Kramer, Chester, N.J., assignor to Ingersoll-Rand Company, New York, N.Y., a corporation of New Jersey
Filed Mar. 19, 1964, Ser. No. 353,140
7 Claims. (Cl. 192—38)

This invention relates to power tools and more particularly to an improved duo directional overrunning clutch for such power tools.

Heretofore, conventional clutches for power tools have been of the type disclosed in U.S. Patents No. 339,259, April 6, 1886, J. W. Blodgett; No. 1,735,125, Nov. 12 1929, W. Miller; No. 2,051,783, Aug. 18, 1936, C. W. Dake; No. 2,258,950, Oct. 14, 1941, J. C. Curtis; and No. 2,297,166, Sept. 29, 1942, L. Robin et al.

An overrunning clutch is one which permits rotation of a shaft in one direction (i.e. clockwise for example) but not in the other direction, namely, counterclockwise. Some conventional overrunning clutches for power tools are of the gear type utilizing a centrifugal clutch and two clutching members. Another conventional clutch is the sprague-type having spring-biased slanted pins in the housing means which pins are moved by the shaft during rotation in one direction to a substantially radial locking position thereby preventing further shaft rotation in this direction. The conventional roller-type clutch utilizes spring biased rollers or balls in wedge-shaped cavities in the housing means, which balls are locked by rotation of the shaft in one direction between the recess and the shaft, thereby preventing further shaft rotation in this direction.

In addition, the clutch disclosed in U.S. Patent 339,259 is operative only if the housing means is rotated relative to the shaft, the shaft is not overrunning, the clutch is not duo directional and utilizes two eccentrics, namely, the cylinder with an eccentric bore and the segment of another cylinder having an eccentric bore.

The clutch disclosed in U.S. Patent 1,735,125 comprises various configurations of a roller clutch, having the duo directional feature.

The conventional clutch shown in U.S. Patent 2,051,783 employs a conventional roller type clutch with a duo directional feature. The eccentric device of this patent is not employed as a clutch and could not function as a clutch.

The conventional clutch of U.S. Patent 2,258,950 utilizes rollers and spragues and is dissimilar to the subject invention.

The conventional clutch of U.S. Patent 2,297,166 utilizes the dual eccentrics of U.S. Patent 339,259.

Most conventional clutches:
(1) Are complicated in structure;
(2) Are expensive to build, install and maintain;
(3) Are subject to wear and eventual part failure;
(4) Have relatively short operative life;
(5) Sacrifice torque capacity to achieve the duo directional feature;
(6) Utilize complex mechanisms to reverse direction of the clutch; and
(7) Cannot be disposed in the neutral position where such clutches are inoperative in either direction.

It is the general object of the present invention to avoid and overcome the foregoing and other difficulties of and objections to prior art practices by the provision of an improved duo directional overrunning clutch for power tools, which clutch:
(1) Is simple and rugged in construction;
(2) Is inexpensive to build, install and maintain;
(3) Is not affected by wear;
(4) Has infrequent part failure;
(5) Has a relatively long operative life;
(6) Has a high torque capacity without overstressing the clutch parts.
(7) Utilizes a simple structure to reverse direction of the clutch; and
(8) Can be disposed in the neutral position to permit free rotation of the shaft in either direction.

The aforesaid objects of the present invention and other objects which will become apparent as the description proceeds, are achieved by providing a duo directional overrunning clutch with a power tool. The improved clutch of the present invention comprises a shaft provided with a center of rotation. Housing means are disposed about the shaft and are provided with a shaft bore in which the shaft is free to rotate. The shaft bore is substantially concentric with the center of rotation. Clutch means are rotatable within the housing means in substantially frictionless engagement with the housing means, and the clutch means is provided with a locking-bore. The clutch means is substantially eccentric with the center of rotation and the locking bore is normally disposed substantially concentric with the center of rotation to permit rotation of one of the shaft and the housing means. The clutch means is rotatable in one direction to cause the locking bore to engage the shaft thereby permitting relative rotative movement between the shaft and the clutch means in the opposite direction and preventing relative rotative movement between said shaft and said clutch means in the one direction.

The invention also contemplates a differential type power tool for applying torque to an object and having a socket engagable with the object. High speed low torque drive means are connected to the socket. Overrunning clutch means are connected to the high speed low torque drive means. Low speed high torque drive means are also connected to the overrunning clutch means to automatically permit high speed run down of said object at low torque in the early stages of the torquing of the object and low speed run down of said object at high torque during the later stages of the torquing of the object.

For a better understanding of the present invention, reference should be had to the accompanying drawings wherein like numerals of reference indicate similar parts throughout the several views and wherein:

FIG. 9 is a free body diagram of the clutch member showing the clutch member pin biased in clockwise direction;

FIG. 10 is a free body diagram of the clutch member showing the clutch member pin biased in counterclockwise direction;

Although the principles of the present invention are broadly applicable to clutches for general use, the present invention is adapted for use as a duo directional overrunning clutch for power tools and hence it has been so illustrated and will be so described.

Figure 1:
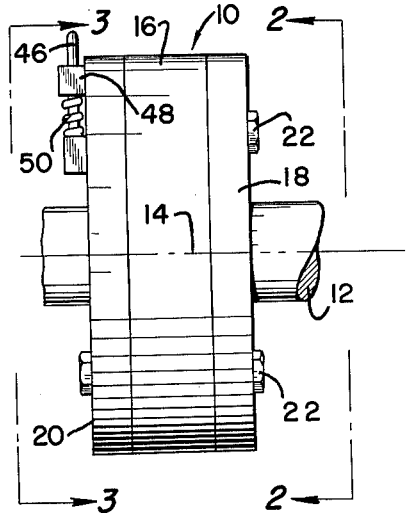
FIG. 1 is a side elevational view of the improved clutch of the present invention.
Figure 4:
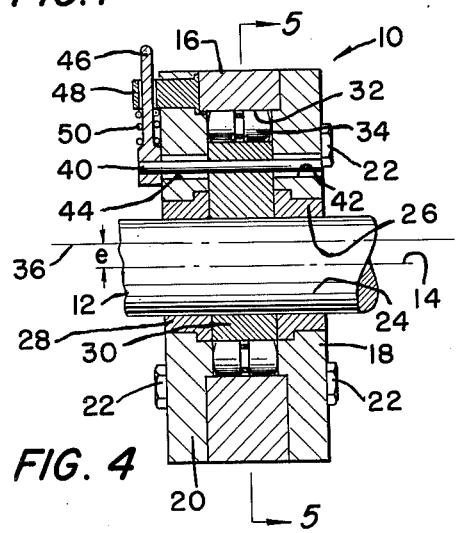
FIG. 4 is a vertical, sectional view of the clutch taken along the line 4—4 of FIG. 3 in the direction of the arrows.

With specific reference to the form of the present invention illustrated in the drawings, and referring particularly to FIGS. 1 and 4, a duo directional overrunning clutch for a power tool, is indicated generally by the reference numeral 10.

Figure 2:
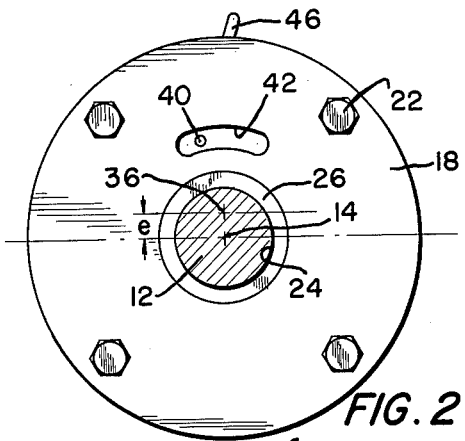
FIG. 2 is an end elevational view of the clutch taken along the line 2—2 of FIG. 1 in the direction of the arrows.
Figure 3:
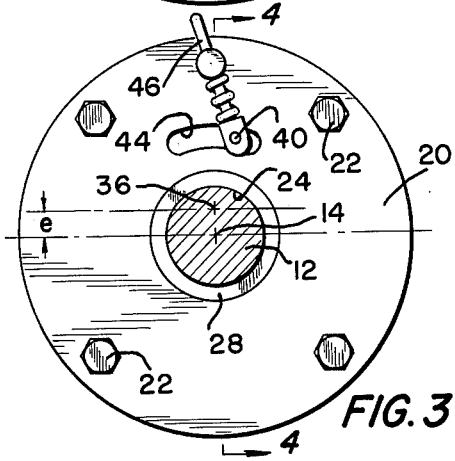
FIG. 3 is an end elevational view of the clutch taken along the line 3—3 of FIG. 1 in the direction of the arrows.

This clutch 10 comprises a shaft 12 (FIGS. 1–10) provided with an axis or center of rotation 14. Housing means, such as the housing 16; (FIGS. 1, 4, 5–10), end plate 18 (FIGS. 1, 2, 4) and end plate 20 (FIGS. 1, 3, 4, 6–8) are integrated by bolts 22 (FIGS. 1–4, 6–8); are disposed about the shaft 12; and are provided with a shaft bore 24 (FIGS. 2–4, 6–8) in bearings 26 (FIGS. 2, 4) and 28 (FIGS. 3, 4, 6–8). The shaft 12 is free to rotate in the shaft bore 24, which shaft bore 24 is substantially concentric with the center of rotation 14 of the shaft 12.

Clutch means, such as the clutch member 30 (FIGS. 4, 5, 6–8, 9, 10), are rotatable within the housing 16 in substantially frictionless engagement with the housing 16. Such substantially frictionless engagement is obtained, for example, (FIGS. 5–8, 9, 10) by disposing ball or roller bearing means 34 in the clutch bore 32 between the clutch member 30 and the housing 16, thereby providing a coefficient of friction between the housing 16 (i.e., clutch bore 32) and the clutch member 30, which coefficient of friction is substantially less than the coefficient of friction between the clutch member 30 (i.e. locking bore 38) and the shaft 12.

Figure 5:
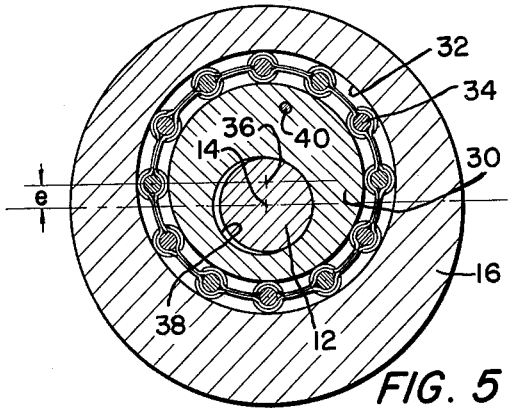
FIG. 5 is a vertical, sectional view of the clutch taken along the line 5—5 of FIG. 4 in the direction of the arrows.
Figure 5A:
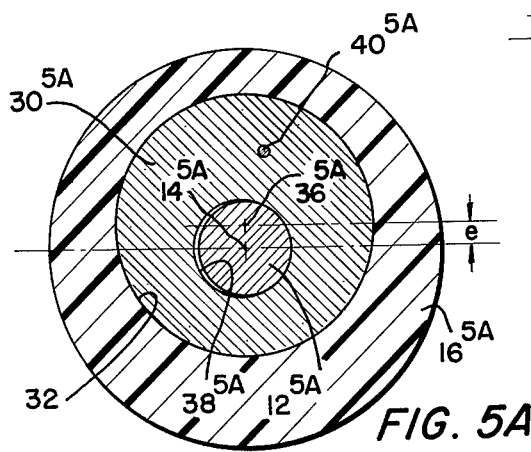
FIG. 5A is a view similar to FIG. 5 showing a preferred embodiment of the clutch in which the clutch member rotates in a bore in the housing means and the housing means is formed of a substantially frictionless plastic material.

Alternatively the clutch member 30⁵A (FIG. 5A) and shaft 12⁵A may be formed of a high strength material, such as steel, ceramic, carbides, etc., and the housing 16⁵A of a low friction plastic, such as Teflon, the trade name of a low friction plastic manufactured by E. I. du Pont Co., Wilmington, Delaware.

Figure 5B:
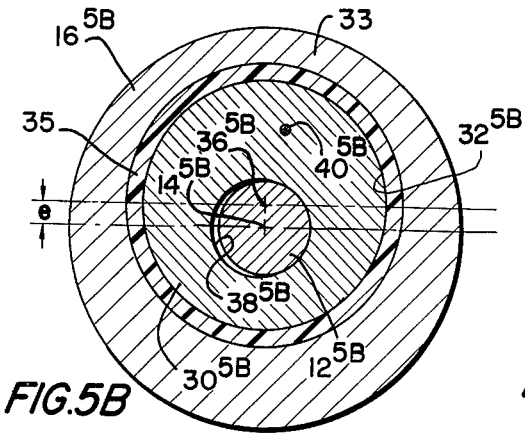
FIG. 5B is a view similar to FIG. 5A showing an alternative embodiment of the housing means wherein said housing means comprises a high strength material sleeve and substantially frictionless sleeve.

As shown in FIG. 5B the housing 16⁵B may comprise a housing sleeve 33 of a high strength material, such as steel, etc., and a bearing sleeve 35 of a low friction material, such as Teflon.

The clutch member 30 has a center or axis of rotation 36 (FIGS. 2–8, 9, 10) which axis of rotation 36 is eccentric by the distance $e$ with the axis of rotation 14 of the shaft 12. In addition, the clutch member 30 is provided with a locking bore 38 (FIGS. 4–8, 9, 10) which locking bore 38 is normally disposed (FIG. 6) substantially concentric with the axis of rotation 14.

A clutch member pin 40 (FIGS. 2–10) projects at both ends (FIG. 4) from clutch member 30 into arcuate slots 42 (FIGS. 2, 4) and 44 (FIGS. 3, 4, 6–8) in end plates 18 and 20, respectively.

*Operation*

Figure 6:
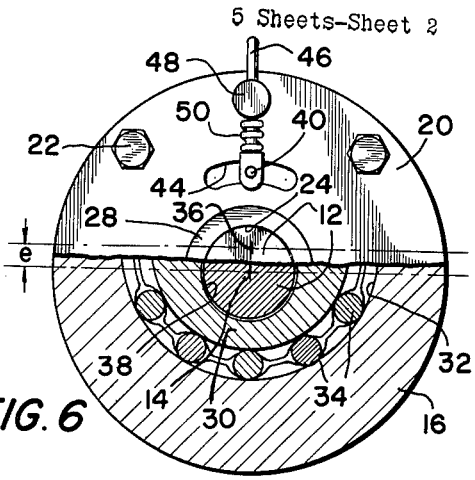
FIG. 6 is a view similar to FIG. 3 but showing the bottom portion of the clutch in vertical section and the biasing means in the neutral position.

The clutch member 30 is biased by moving the clutch member pin 40 by hand, for example, in one direction, namely, clockwise (FIG. 7) or counterclockwise (FIG. 8) from the position shown in FIG. 6 to cause the locking bore 38 to engage the shaft 12 thereby permitting relative rotative movement between the shaft 12 and the housing 16 in the opposite direction.

Referring to FIG. 6, the shaft 12 or housing 16 can move relative to each other in either direction (i.e., clockwise or counterclockwise as viewed in FIG. 6). No torque can be transmitted from the shaft 12 to the housing 16 or from the housing 16 to the shaft 12.

Figure 7:
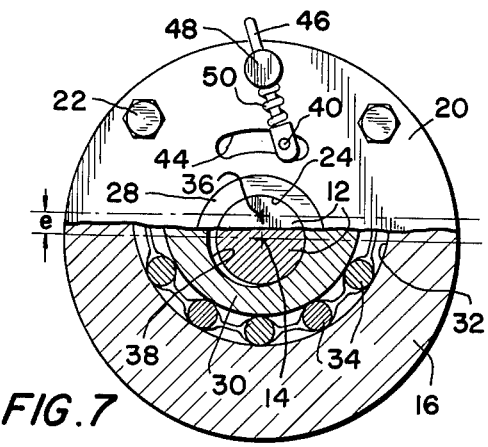
FIG. 7 is a view similar to FIG. 6 showing the biasing means urging the clutch member clockwise, as viewed in FIG. 7, with respect to the shaft and the housing means.

When the clutch member pin 40 is in the position shown in FIG. 7, the shaft 12 rotates freely only in counterclockwise direction, as viewed in FIG. 7, where the housing 16 is stationary. The housing 16 rotates freely only in clockwise direction, as viewed in FIG. 7 where the shaft 12 is stationary.

Figure 8:
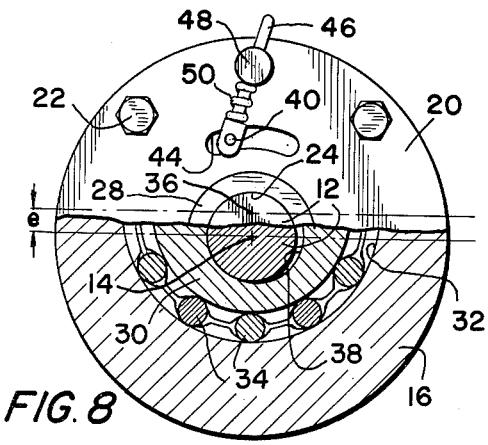
FIG. 8 is a view similar to FIGS. 6 and 7 showing the biasing means urging the clutch member counterclockwise as viewed in FIG. 8, with respect to the shaft and the housing means.

Referring now to FIG. 8, it will be understood that when the clutch member pin 40 is in the position shown in such figure, the shaft 12 rotates freely only in clockwise direction, as viewed in FIG. 8 where the housing 16 is stationary. The housing 16 rotates freely only in counterclockwise direction as viewed in FIG. 8 when the shaft 12 is stationary.

Referring to FIGS. 9 and 10, the forces, distances and angles shown therein are defined as follows:

$e$ = eccentricity of locking bore 38 with respect to the outside diameter of the clutch member 30
$F_1$ = force applied to shaft 12 by clutch member 30
$F_2$ = sum of the reactive forces acting on the outside diameter of clutch member 30
$F_s$ = force on clutch member pin 40
$F_{u1}$ = frictional force between shaft 12 and locking bore 38
$F_{u2}$ = frictional force between clutch member 38 and rollers 34
$U_1$ = coef. of friction between shaft 12 and locking bore 38
$U_2$ = coef. of friction between clutch member 30 and rollers 34
$\theta \mathcal{J}$ = direction of relative rotation between shaft 12 and clutch member 30
$r_1$ = radius of shaft 12
$r_2$ = radius of clutch member 30
$r_s$ = normal dist. from eccentric center 36 to a line along which force $F_s$ acts.
$\phi = \text{Arctan } e/r_1$

Alternative embodiments

It will be understood by those skilled in the art that alternatively the clutch member 30 may be biased automatically by biasing means connected to clutch member 30 for normally disposing the clutch bore 38 substantially concentric with the center of rotation 14 (FIG. 6) to permit rotation of the shaft 12 in both directions and to move the clutch member 30 to the positions shown in FIGS. 7 and 8.

Such biasing means comprises a yoke 46 (FIGS. 1, 3, 4, 6–8) pivoted at pin 48 (FIGS. 1, 3, 4, 6–8), connected to the clutch member pin 40, and biased by a spring 50 (FIGS. 1, 3, 4, 6–8).

Figure 11:
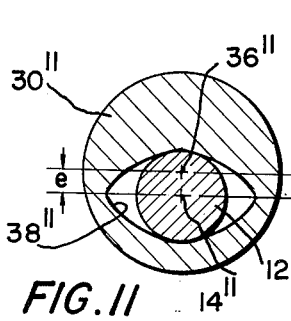
FIG. 11 is a fragmentary, vertical, sectional view of the clutch member and shaft, the clutch bore being arcuate and formed as a segment of a paraboloid.
Figure 12:
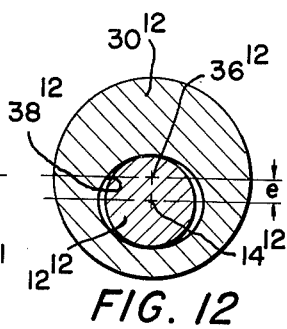
FIG. 12 is a view similar to FIG. 11, the arcuate clutch bore being formed of as a segment of an ellipsoid.
Figure 13:
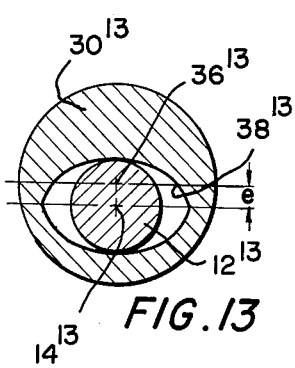
FIG. 13 is a view similar to FIGS. 11 and 12, the locking portions of the clutch bore being formed as a segment of a hyperboloid.

As shown in FIGS. 11–13, the arcuate locking portion of the clutch bore $38^{11}$ may be partially a segment of a paraboloid (FIG. 11), the arcuate locking portion of the clutch bore $38^{12}$ may be a segment of an ellipsoid (FIG. 12) and the arcuate locking portion of the clutch bore $38^{13}$ may be a segment of a hyperboloid.

Figure 14:
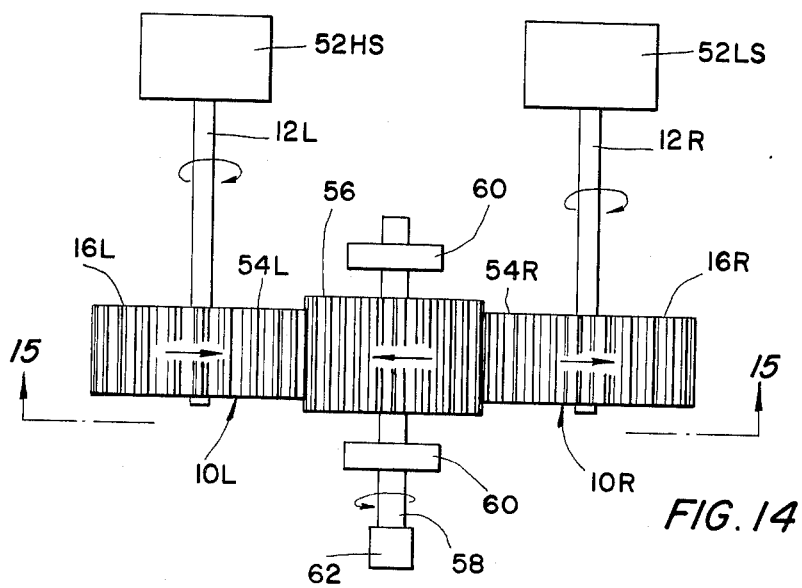
FIG. 14 is a diagrammatic plan view of a power tool embodying the clutch of the present invention.

In FIG. 14 a high-speed, low-torque motor 52 HS and low-speed, high-torque motor 52 LS are connected to the shafts 12L and 12R, respectively, of clutches 10L and 10R, respectively, (not necessarily of the duo directional type). The housings 16L and 16R of the clutches 10L and 10R, respectively, have geared surfaces 54L and 54R, respectively, which geared surfaces mesh with a sun gear 56 on a driven shaft 58, journalled in bearings 60 and carrying a socket 62 engageable with a threaded fastener (not shown).

Figure 15:
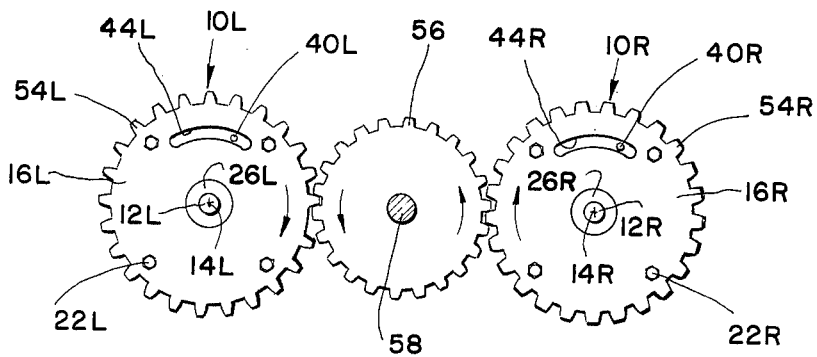
FIG. 15 is a side elevational view along the line 15—15 of FIG. 14 in the direction of the arrows.

With the clutch member pin 40L (FIG. 15) biased clockwise, as viewed in FIG. 15, the high-speed low-torque motor 52 HS drives the shaft 12L and housing 16L in clocking direction also thereby driving the sun gear 56, the driven shaft 58 and the socket 62 in counterclockwise direction.

With the clutch member pin 40R (FIG. 15) biased in clockwise direction, as viewed in FIG. 15, and the shaft 12R driven in clockwise direction by the low-speed, high-torque motor 52 LS, the sun gear 56, driven shaft 58 and socket 62 are also driven in counterclockwise direction by the housing 16R.

The net result is a differential-type power tool which automatically permits high-speed run down at low torque in the early stages of the torquing of the threaded fastener (not shown) by the motor 52 HS and then low-speed run down at high torque of the fastener (not shown) by the motor 52 LS.

Figure 16:
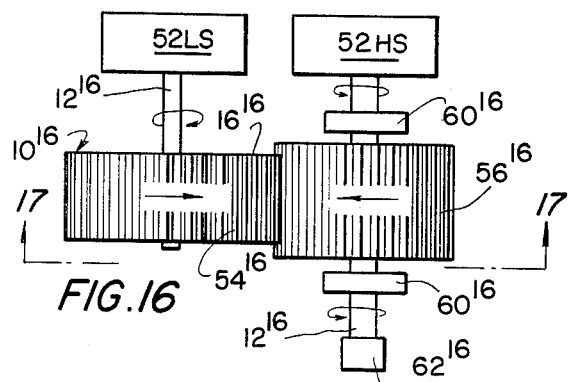
FIG. 16 is a view similar to FIG. 14 of an alternative embodiment showing the high speed, low torque motor connected directly to the sun gear and the low speed high torque motor connected through a clutch to the sun gear.
Figure 17:
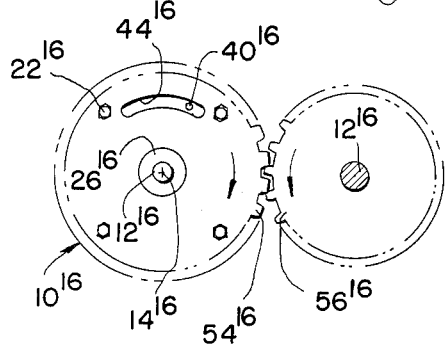
FIG. 17 is a view similar to FIG. 15 taken along the line 17—17 of FIG. 16 in the direction of the arrows.

Alternatively, it will be recognized by those skilled in the art and as shown in FIGS. 16, 17 the high-speed, low-torque motor 52 HS has its shaft $12^{16}$ connected to the sun gear $56^{16}$ and to the socket $62^{16}$. The clutch member pin $40^{16}$ (FIG. 17) is biased clockwise.

Figure 18:
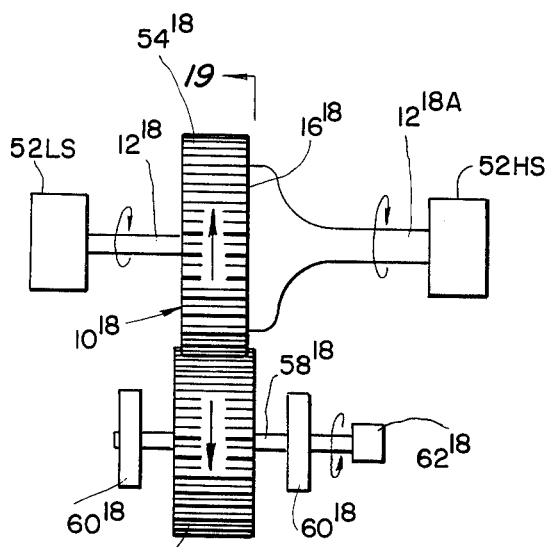
FIG. 18 is a view similar to FIGS. 14, 16 of a further alternative embodiment showing the low speed high torque motor connected to the clutch shaft and the high speed, low torque motor connected to the housing of the clutch.
Figure 19:
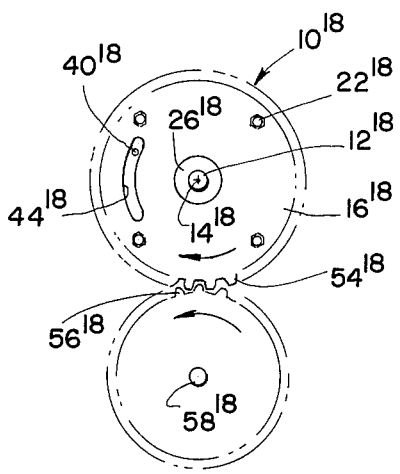
FIG. 19 is a view similar to FIGS. 15, 17 taken along the line 19—19 of FIG. 18 in the direction of the arrows.

Referring to FIGS. 18, 19 a further alternative embodiment comprises the low speed high torque motor 52 LS connected to the clutch shaft $12^{18}$ and the high-speed low-torque motor 52 HS connected by means of its shaft $12^{18A}$ to the housing $16^{18}$ of the clutch $10^{18}$. As shown in FIG. 19 the clutch member pin $40^{18}$ is biased clockwise.

Figure 20:
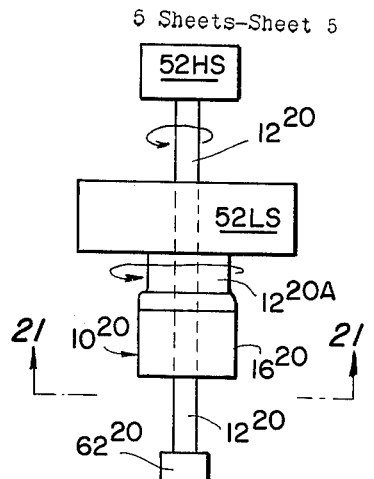
FIG. 20 is a view similar to FIGS. 14, 16, 18 of a still further alternative embodiment showing the high speed low torque motor connected by the clutch shaft directly to the socket and the low speed high torque motor connected to the clutch housing.
Figure 21:
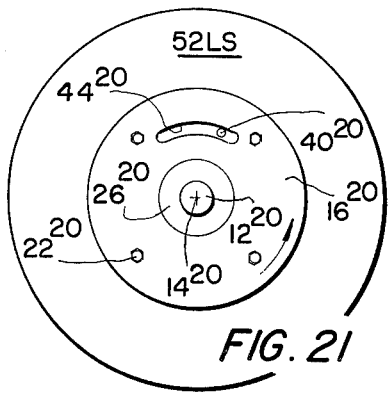
FIG. 21 is an enlarged view similar to FIGS. 15, 17, 19 taken along the line 21—21 of FIG. 20 in the direction of the arrows.

In the still further alternative embodiment of FIGS. 20, 21 the high-speed, low-torque motor 52 HS is connected directly through the clutch shaft $12^{20}$ (which shaft $12^{20}$ passes through the low-speed, high-torque motor 52 LS and clutch $10^{20}$) to the socket $62^{20}$. The low-speed, high-torque motor 52 LS is connected by means of its shaft $12^{20A}$ to the housing $16^{20}$ of the clutch $10^{20}$. As shown in FIG. 21 the clutch member pin $40^{20}$ is biased clockwise.

It will be recognized by those skilled in the art that the objects of the present invention have been achieved by providing a duo directional overrunning clutch which:

(1) Is simple and rugged in construction;
(2) Is inexpensive to build, install and maintain;
(3) Is not affected by wear;
(4) Has infrequent part failure;
(5) Has a relatively long operative life;
(6) Has a high torque capacity without overstressing the clutch parts;
(7) Utilizes a simple structure to reverse direction of the clutch; and
(8) Can be disposed in the neutral position to permit free rotation of the shaft in either direction.

While in accordance with the patent statutes preferred and alternative embodiments of the present invention have been illustrated and described in detail, it is to be particularly understood that the invention is not limited thereto or thereby.

I claim:
1. A clutch comprising:
  (a) a shaft provided with a center of rotation;
  (b) housing means disposed about said shaft and provided with a pair of axially spaced shaft bores in which said shaft is free to rotate, said shaft bores being substantially concentric with said center of rotation;
  (c) clutch means rotatable within said housing means in substantially frictionless engagement with said housing means and provided with a locking bore located axially between said shaft bores;
  (d) said clutch means being rotatable in said housing about an axis which is eccentric with said center of rotation;
  (e) said locking bore being normally disposed substantially concentric with said center of rotation to permit rotation of one of said shaft and said housing means; and
  (f) said clutch means being movable in one direction to cause said locking bore to eccentrically engage said shaft thereby permitting relative rotative movement between said shaft and said housing means in the opposite direction and preventing relative rotative movement between said shaft and said housing means in said one direction.
2. The clutch recited in claim 1 and having:
  (a) biasing means connected to said clutch means for normally urging said clutch means to alternate positions to dispose said locking bore substantially eccentric with said center of rotation to permit the locking together of said shaft and housing in alternate directions of rotation of said shaft in said housing.
3. The clutch recited in claim 1 wherein:
  (a) said locking bore has an arcuate locking portion.
4. The clutch recited in claim 1 wherein:
  (a) said locking bore has an arcuate locking portion which is a segment of a cylinder.
5. The clutch recited in claim 1 wherein:
  (a) said locking bore has an arcuate locking portion which is a segment of a paraboloid.
6. The clutch recited in claim 1 wherein:
  (a) said locking bore has an arcuate locking portion which is a segment of an ellipsoid.
7. The clutch recited in claim 1 wherein:
  (a) said locking bore has an arcuate locking portion which is a segment of a hyperboloid.

References Cited by the Examiner
UNITED STATES PATENTS

| | | | |
|---|---|---|---|
| 2,588,515 | 3/1952 | Gilson | 192—38 |
| 2,791,303 | 5/1957 | Lauxmann | 192—38 |
| 3,082,742 | 3/1963 | Vilmerding et al. | 81—52.4 |
| 3,088,349 | 5/1963 | Cowan et al. | 81—52.4 |

DAVID J. WILLIAMOWSKY, *Primary Examiner.*

A. T. McKEON, *Assistant Examiner.*